(12) United States Patent
Wilson et al.

(10) Patent No.: US 10,760,413 B2
(45) Date of Patent: Sep. 1, 2020

(54) ELECTROMAGNETIC TELEMETRY FOR SENSOR SYSTEMS DEPLOYED IN A BOREHOLE ENVIRONMENT

(71) Applicant: Halliburton Energy Services, Inc., Houston, TX (US)

(72) Inventors: Glenn A. Wilson, Singapore (SG); Ahmed Fouda, Houston, TX (US); Burkay Donderici, Houston, TX (US); Li Gao, Katy, TX (US); Krishna M. Ravi, Kingwood, TX (US); Mark W. Roberson, Cary, NC (US); Scott Goodwin, Chapel Hill, NC (US); Charles Bartee, Durham, NC (US); Alexander Stewart, Research Triangle Park, NC (US)

(73) Assignee: Halliburton Energy Services, Inc., Houston, TX (US)

( * ) Notice: Subject to any disclaimer, the term of this patent is extended or adjusted under 35 U.S.C. 154(b) by 381 days.

(21) Appl. No.: 15/526,301

(22) PCT Filed: Dec. 31, 2014

(86) PCT No.: PCT/US2014/073041
§ 371 (c)(1),
(2) Date: May 11, 2017

(87) PCT Pub. No.: WO2016/108904
PCT Pub. Date: Jul. 7, 2016

(65) Prior Publication Data
US 2017/0342826 A1 Nov. 30, 2017

(51) Int. Cl.
*E21B 47/13* (2012.01)
*G01V 11/00* (2006.01)
(Continued)

(52) U.S. Cl.
CPC ............... *E21B 47/13* (2020.05); *G01V 3/28* (2013.01); *G01V 3/38* (2013.01); *G01V 11/002* (2013.01)

(58) Field of Classification Search
CPC ..... E21B 47/122; E21B 47/13; G01V 11/002; G01V 3/28; G01V 3/38
See application file for complete search history.

(56) References Cited

U.S. PATENT DOCUMENTS 4,839,644 A * 6/1989 Safinya ............... E21B 47/122
340/854.3
5,157,687 A * 10/1992 Tymes ............... G06K 7/0008
235/385
(Continued)

FOREIGN PATENT DOCUMENTS

EP 0763295 10/2002
EP 2741427 6/2014
(Continued)

OTHER PUBLICATIONS

International Search Report and Written Opinion of PCT Application No. PCT/US2014/073041 dated Sep. 21, 2015: pp. 1-19.

*Primary Examiner* — John Fitzgerald
(74) *Attorney, Agent, or Firm* — Chamberlain Hrdlicka

(57) ABSTRACT

Disclosed are telemetry systems and methods that employ a plurality of electromagnetic transceivers disposed outside a well casing string at a corresponding plurality of depths along the casing string. Each transceiver includes one or more toroidal inductors circumferentially surrounding the casing string and inductively coupled thereto to allow signal transmission between transceivers via currents induced in the casing. In some embodiments, signals are relayed via a chain of transceivers to facilitate indirect communication
(Continued)

between a surface facility and other transceivers located too deep for direct communication to the surface.

23 Claims, 10 Drawing Sheets

(51) Int. Cl.
*G01V 3/28* (2006.01)
*G01V 3/38* (2006.01)

(56) References Cited

U.S. PATENT DOCUMENTS

| | | | |
|---|---|---|---|
| 6,985,750 B1* | 1/2006 | Vicknair | H04W 8/20 370/310 |
| 7,126,492 B2* | 10/2006 | Wisler | E21B 17/003 340/854.3 |
| 7,145,473 B2* | 12/2006 | Wisler | E21B 17/003 340/854.3 |
| 7,163,065 B2* | 1/2007 | Zhang | E21B 47/122 166/385 |
| 7,170,424 B2* | 1/2007 | Vinegar | E21B 47/12 166/66 |
| 7,568,532 B2* | 8/2009 | Kuckes | E21B 47/0228 175/40 |
| 9,062,537 B1* | 6/2015 | Holt | E21B 44/00 |
| 9,714,567 B2* | 7/2017 | Godager | E21B 47/122 |
| 10,030,510 B2* | 7/2018 | Godager | E21B 47/122 |
| 10,053,976 B2* | 8/2018 | Nguyen | E21B 47/122 |
| 10,132,160 B2* | 11/2018 | Roberson | E21B 47/13 |
| 10,392,932 B2* | 8/2019 | Wilson | E21B 47/135 |
| 10,474,853 B2* | 11/2019 | Roberson | G06K 7/10356 |
| 2002/0000808 A1* | 1/2002 | Nichols | G01V 3/28 324/339 |
| 2003/0038734 A1* | 2/2003 | Hirsch | E21B 43/00 340/853.1 |
| 2003/0066652 A1* | 4/2003 | Stegemeier | E21B 43/12 166/373 |
| 2003/0227393 A1* | 12/2003 | Vinegar | E21B 17/003 340/854.3 |
| 2005/0046589 A1* | 3/2005 | Wisler | E21B 17/003 340/854.6 |
| 2005/0269083 A1* | 12/2005 | Burris, II | E21B 23/00 166/255.2 |
| 2007/0278008 A1* | 12/2007 | Kuckes | E21B 47/024 175/40 |
| 2011/0061862 A1 | 3/2011 | Loretz et al. | |
| 2011/0128999 A1 | 6/2011 | Ruegamer et al. | |
| 2011/0186290 A1* | 8/2011 | Roddy | E21B 47/0005 166/253.1 |
| 2011/0187556 A1* | 8/2011 | Roddy | G01V 15/00 340/853.3 |
| 2011/0192597 A1* | 8/2011 | Roddy | E21B 33/13 166/253.1 |
| 2011/0192598 A1* | 8/2011 | Roddy | E21B 33/13 166/253.1 |
| 2011/0199228 A1* | 8/2011 | Roddy | E21B 33/13 340/856.4 |
| 2012/0205103 A1 | 8/2012 | Ravi et al. | |
| 2013/0154650 A1* | 6/2013 | Bittar | E21B 47/02216 324/336 |
| 2013/0240205 A1* | 9/2013 | Tosi | E21B 43/14 166/250.17 |
| 2013/0241742 A1* | 9/2013 | Contant | G01V 3/30 340/854.6 |
| 2014/0008083 A1* | 1/2014 | Ring | E21B 23/06 166/382 |
| 2014/0111349 A1* | 4/2014 | Roberson | E21B 47/122 340/854.8 |
| 2014/0174732 A1* | 6/2014 | Goodwin | E21B 33/13 166/255.1 |
| 2014/0182845 A1* | 7/2014 | Roberson | E21B 33/13 166/250.07 |
| 2014/0182848 A1* | 7/2014 | Roberson | E21B 33/13 166/253.1 |
| 2014/0367092 A1 | 12/2014 | Roberson et al. | |
| 2015/0167452 A1* | 6/2015 | Godager | E21B 47/122 340/854.6 |
| 2015/0226058 A1* | 8/2015 | Stolpman | E21B 47/18 702/9 |
| 2015/0275656 A1* | 10/2015 | Holt | E21B 44/00 340/855.4 |
| 2015/0330212 A1* | 11/2015 | Sassi | E21B 47/065 166/250.1 |
| 2016/0047234 A1* | 2/2016 | Switzer | H04J 9/00 340/854.6 |
| 2017/0138132 A1* | 5/2017 | Wilson | G01V 3/28 |
| 2017/0204724 A1* | 7/2017 | Godager | E21B 47/122 |
| 2017/0256839 A1* | 9/2017 | Korovin | H01Q 7/08 |
| 2017/0321544 A1* | 11/2017 | Wilson | E21B 49/00 |
| 2017/0342826 A1* | 11/2017 | Wilson | G01V 11/002 |
| 2018/0003036 A1* | 1/2018 | Roberson | E21B 47/101 |
| 2018/0010446 A1* | 1/2018 | Roberson | E21B 47/122 |
| 2018/0010449 A1* | 1/2018 | Roberson | E21B 47/06 |
| 2018/0030824 A1* | 2/2018 | Roberson | E21B 33/14 |
| 2018/0082090 A1* | 3/2018 | Roberson | G06K 7/10009 |
| 2018/0196006 A1* | 7/2018 | Capoglu | G01V 3/30 |

FOREIGN PATENT DOCUMENTS

| | | |
|---|---|---|
| WO | 2007004891 | 1/2007 |
| WO | 2015073138 | 5/2015 |
| WO | 2015178876 | 11/2015 |
| WO | 2015199648 | 12/2015 |

* cited by examiner

ELECTROMAGNETIC TELEMETRY FOR SENSOR SYSTEMS DEPLOYED IN A BOREHOLE ENVIRONMENT

BACKGROUND

This disclosure relates generally to electromagnetic (EM) telemetry within a borehole, and more particularly to telemetry that provides particular capabilities for providing communication between sensors permanently deployed outside casing in a borehole.

During completion and servicing of a borehole, sensors can be employed along the exterior of the borehole casing to monitor the condition of well-servicing and other fluids in the annulus formed between the casing and borehole wall, or, more generally, to monitor conditions of the wellbore, of the surrounding formation, and/or of tools and materials used inside the wellbore. For example, when a borehole is completed by securing the casing in place with cement or another suitable sealant (such as, e.g., a polymer, resin, or latex-based sealant) (all such sealants generically referred to herein as "cement"), it is often desirable to measure one or more cement parameters (e.g., resistivity, permittivity, moisture content, temperature, pH, and/or ion concentration) in order to monitor the integrity thereof. Fluid-sensing approaches used for this and similar purposes include, without limitation, RFID tag detection and EM-based fluid characterization.

In various implementations, the sensors are deployed outside (or "behind") the borehole casing, for instance, mounted to the exterior surface of the casing. A system for transmitting signals from these sensors to the surface for processing and evaluation is needed. In many circumstances, however, signal transmission via electrical or optical cables does not pose a viable solution for downhole-to-surface telemetry. For offshore wells, for example, regulations may require that no cables be clamped to the exterior of the casing because any such cables could present a potential conduit for fluid flow that could result in failure of the well's integrity. Accordingly, systems and methods for wireless telemetry between sensors deployed downhole and a surface-based control and data-acquisition/processing facility are needed.

DETAILED DESCRIPTION

Figure 1:
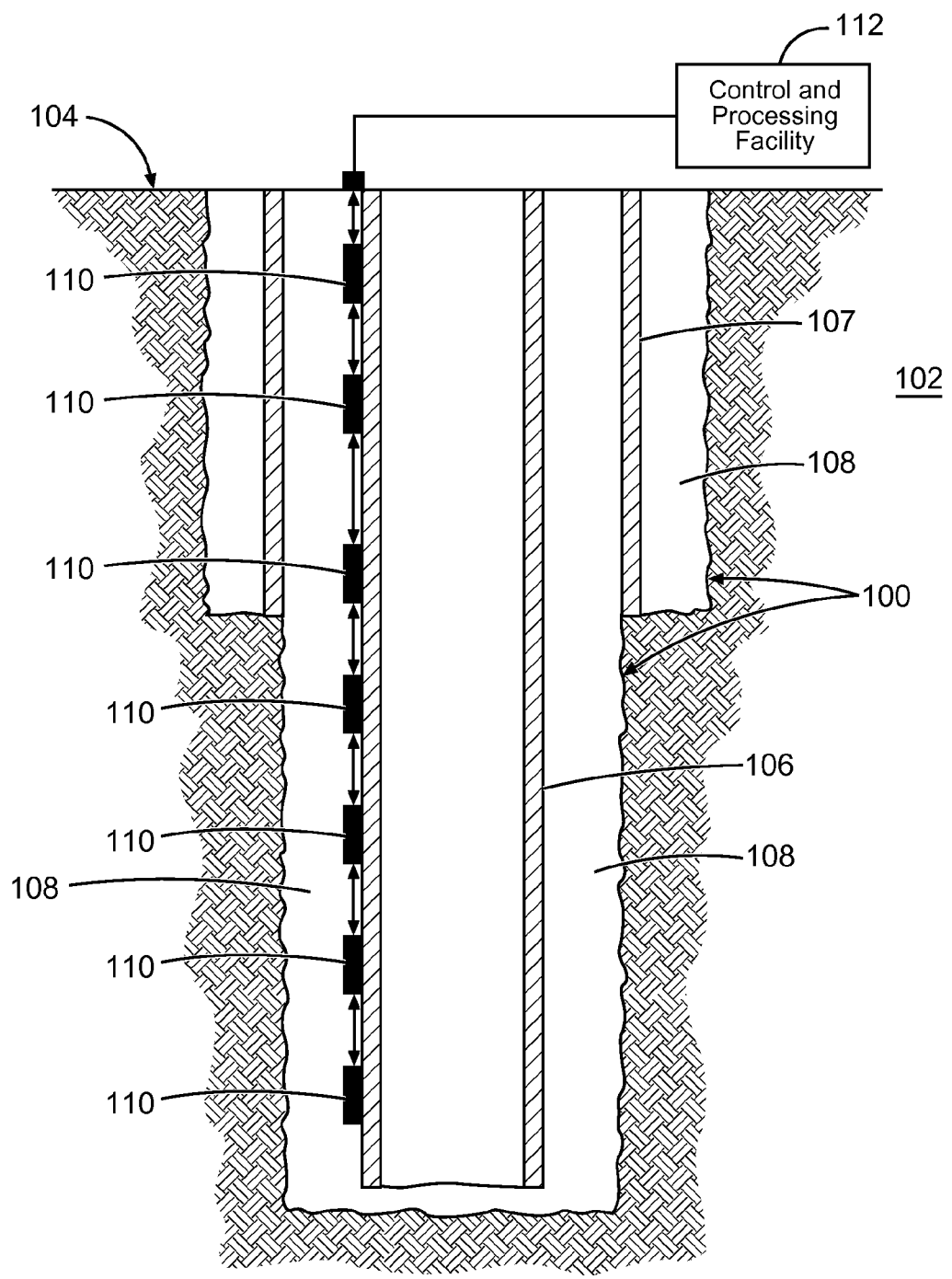
FIG. 1 is a schematic cross-sectional view of an example sensor and wireless telemetry system implemented in a borehole environment in accordance with various embodiments.

Disclosed herein are telemetry systems and methods for two-way communication between a plurality of transceivers located outside a well casing string at various depths therealong (herein, "depth" refers to a distance from the surface, measured along, i.e., locally parallel to, an axis of the casing string, regardless of whether the casing string, or segment thereof, is vertical or not; in other words, the term "depth" is to be understood broad enough to allow for slanted or horizontal wells). In some embodiments, each transceiver includes a toroidal inductor circumferentially surrounding the electrically conductive casing string and inductively coupled thereto, allowing signals to be transmitted between transceivers at least partially via currents induced in the casing. Such signal transmission may serve to communicate data acquired by a plurality of sensors (e.g., fluid sensors for monitoring the condition of the cement or other sealant securing the casing) located proximate respective transceivers to a control and processing facility located above surface, and to transmit control signals from the surface facility to the sensors and/or transceivers. (Herein, a sensor is deemed "proximate" a certain transceiver if it is uniquely physically associated with that transceiver by virtue of, for example, a distance between the sensor and transceiver not exceeding a specified maximum distance (e.g., in some embodiments, twelve inches), integration of the sensor and transceiver into the same package, mounting of the sensor and transceiver on the same support, and/or a direct electrical connection between the sensor and transceiver.) In particular, signals may be relayed via a chain of transceivers to facilitate indirect communication between the surface facility and those sensors that are located too deep for direct wired or wireless communication.

The spaced relations between transceivers may be such that each transceiver is coupled to at least one other transceiver located thereabove (i.e., at a smaller depth) or to the surface facility. In one embodiment, a first transceiver transmits a signal including data from a first sensor proximate the first transceiver, and a second transceiver located above and in a spaced relation to the first transceiver receives the signal and transmits a second signal that relays the data from the first sensor and, optionally, further includes data from a second senor proximate the second transceiver. The surface control and processing facility may be communicatively coupled to the chain of transceivers via a wireless connection with one (e.g., the highest one) of the transceivers, or alternatively via a wired connection, such as with an optical fiber. In various embodiments, the transceivers are spaced at intervals not exceeding 120 feet, not exceeding 90 feet, not exceeding 60 feet, or not exceeding 30 feet. For example, the casing string may include a plurality of 30-feet segments coupled together (e.g., via threaded connections), and each segment may have a respective transceiver located thereat; the transceivers may be uniformly spaced at a distance of about 30 feet between nearest neighbors. Alternatively, transceivers may be located at only every other or every third 30-feet segment, resulting in transceiver spacings of about 60 feet or about 90 feet, respectively. In various embodiments, the transceivers are configured to transmit signals in the frequency range from 10 kHz to 3 MHz, depending on the distances between transceivers, the formation resistivity, and whether the transceivers are surrounded by a secondary casing string (see, e.g., FIG. 1). For example, in some embodiments where single casing is used and the transceivers are spaced 30 feet apart, signals are transmitted within the frequency range from 20 kHz to 200 kHz.

In some embodiments, the transceivers are separated into two or more disjoint groups of transceivers, where the transceivers within each group are communicatively coupled to each other but not to transceivers in another group, such that each group provides a separate signal channel. Such multiple groups and corresponding separate signal channels may be formed, for example, by using different frequency bands for data transmission within different groups, by assigning different time slots for different groups, or by configuring the transceivers within each group to address signals only to other transceivers within that group (e.g., such as by identifying the receiving transceiver in a signal header). In some cases, the transceivers of two groups may be disposed along the casing string in an alternating fashion. Also, the grouping of transceivers may be fixed or dynamically configurable.

In some embodiments, one or more of the transceivers are configured to each operate in multiple frequency bands so as to support multiple corresponding signal channels. For example, the electronic circuitry of a transceiver may generate a superposition of signal components falling within different frequency bands, which may then be transmitted by the toroidal conductor as a composite signal. Conversely, a transceiver may be configured to receive and decode signals sent from multiple nearby transceivers in multiple different frequency bands.

FIG. 1 schematically illustrates an example sensor and wireless telemetry system deployed in a borehole environment, in accordance with various embodiments. As shown, a wellbore 100 has been drilled into subterranean (e.g., oil- or gas-bearing) formation 102 located beneath the earth's surface 104. (While the wellbore 100 is shown as oriented vertically, it can also include slanted or even horizontal portions.) Further, during well completion, casing strings 106, 107 have been placed in the wellbore 100 to stabilize the well and to facilitate the production of oil and gas from the formation 102. Although shown as contiguous pipes, each of the casing strings 106, 107 may include multiple pipe sections (each being, e.g., thirty feet in length), which may be connected to each other via threads machined into the ends of the sections. The casing strings 106, 107 may be made of steel or another suitable metal or alloy. To secure the casing strings 106, 107 in place and to isolate different formations penetrated by wellbore 100 from one another, the annulus 108 formed between the casing strings 106, 107 and the formation sidewalls defining the wellbore 100 will commonly be filled with cement or another suitable sealant.

As is known to those of ordinary skill in the art, wellbores are often drilled in stages to form multiple borehole sections with smaller and smaller diameters. The individual borehole sections may be completed using casing strings of correspondingly different diameters, which may be nested inside each other. In some embodiments, the inner, smaller-diameter casing string of a deeper borehole section is hung from the preceding larger-diameter casing string. In other embodiments, as shown, multiple nested casing strings extend (from different depths) all the way to the surface 104 (see casing string 106 nested in casing string 107); accordingly, a portion (or portions) of the wellbore 100 may have double (or, more generally, multifold) casing; in this case, the region between the two casings may likewise be filled with cement.

In various embodiments, a plurality of sensors and associated telemetry components are disposed behind the casing (e.g., the inner casing string 106) at multiple locations along the longitudinal borehole axis. (If the inner casing is hung from the outer casing and does not extend all the way up to the surface, a transceiver chain can be formed of transceivers placed behind the outer casing in the upper borehole section and communicatively coupled with transceivers placed behind the inner casing in the lower borehole section.) The sensor(s) and telemetry components at any such longitudinal locations are often integrated into an electronic device package (conceptually depicted in FIG. 1 as elements 110). (Note that, although shown for simplicity at only one circumferential position of the casing string, the packages 110 may include components that circumferentially surround the casing string, as explained below with respect to FIG. 4.) As indicated by arrows in FIG. 1, the sensor/telemetry packages 110 may be spaced such that at least neighboring packages 110 are in direct communication with each other. Further, each sensor/telemetry package 110 may be communicatively coupled to a control and processing facility 112 located at or above the surface 104 via one or more intervening sensor/telemetry packages 110 placed therebetween (if not directly). The sensor/telemetry packages 110 may be uniformly spaced (e.g., about every 30 feet, corresponding to one package per section of casing) throughout at least a portion of the length of the casing string. For boreholes that include single-cased and double-cased sections, the spacing may differ between different sections; for example, the spacing can be increased in the double-cased section, for reasons set forth below in the context of FIGS. 6A-6C.

Figure 2:
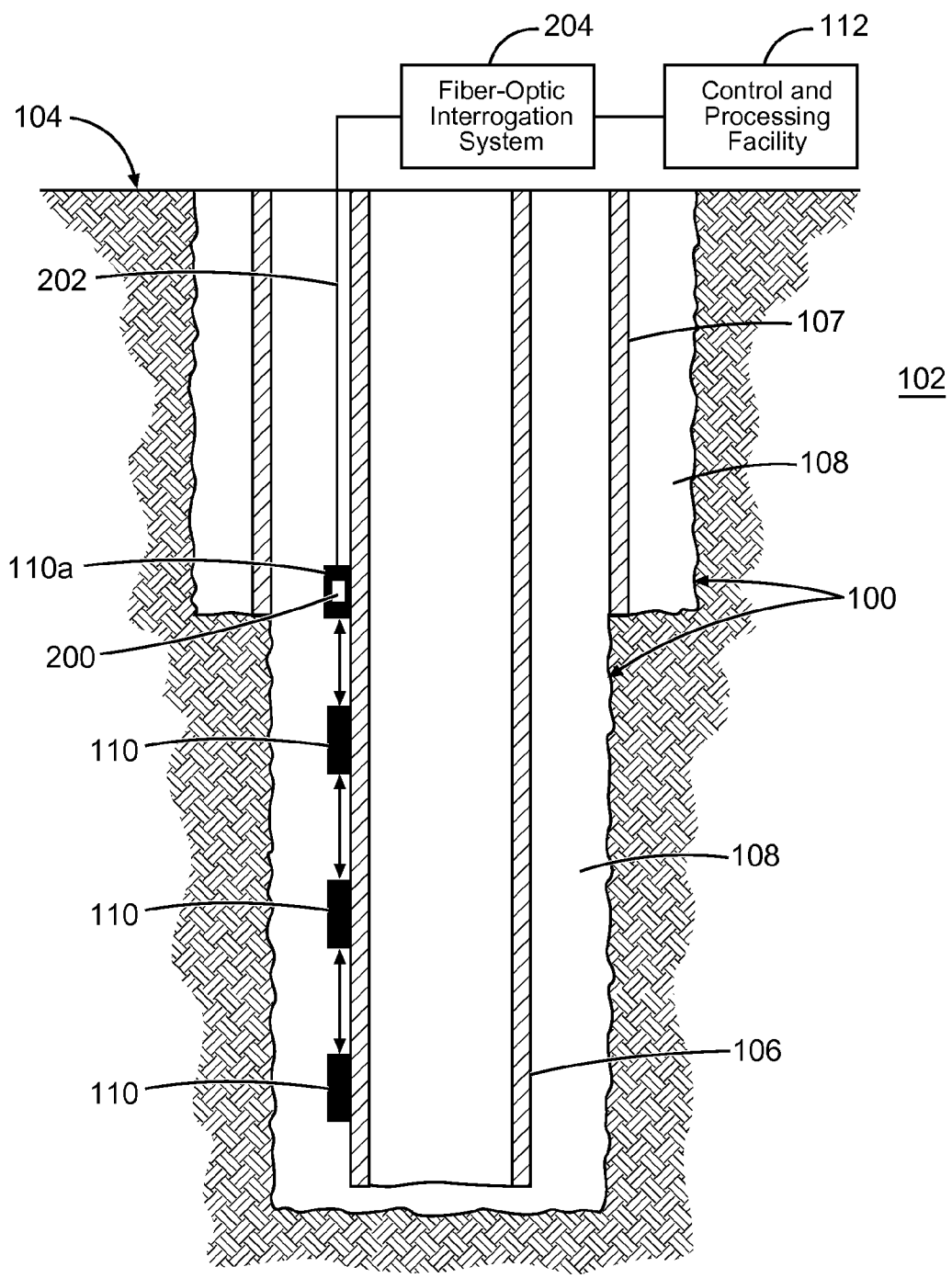
FIG. 2 is a schematic cross-sectional view of an example sensor and telemetry system utilizing a combination of wireless and optical telemetry in accordance with various embodiments.

FIG. 2 illustrates an alternative sensor and telemetry system, in accordance with various embodiments. Herein, signal transmission through the upper, double-cased section of the borehole (where sensors between the casings may not be needed) is accomplished by wired, optical telemetry. Specifically, the upper-most electronic sensor package 110a (which may or may not contain a fluid sensor) may include a fiber-optic induction sensor 114 that couples to an optical fiber 116 deployed behind (as shown) or inside the (inner) casing string 106 and returning to the surface. The optical fiber 116 may be included in a tubing-encapsulated cable (TEC). The optical fiber 116 and the optical induction sensor 114 may be remotely interrogated, using any of a variety of interrogation methods known to those of ordinary skill in the art, by a fiber-optic interrogation system 118 coupled, in turn, to the control and processing facility 112. In the illustrated embodiment, the use of an optical cable connection is rendered feasible due to the outer casing 107 surrounding the optical fiber 116, which mitigates any borehole integrity concerns related to the cable as a potential conduit for fluid flow. Even without such a protective outer casing 107, optical telemetry in the upper portion of the borehole may be permissible, as long as the fiber-optic induction sensor 114 is located above the zones where borehole integrity is a concern.

Figure 3:
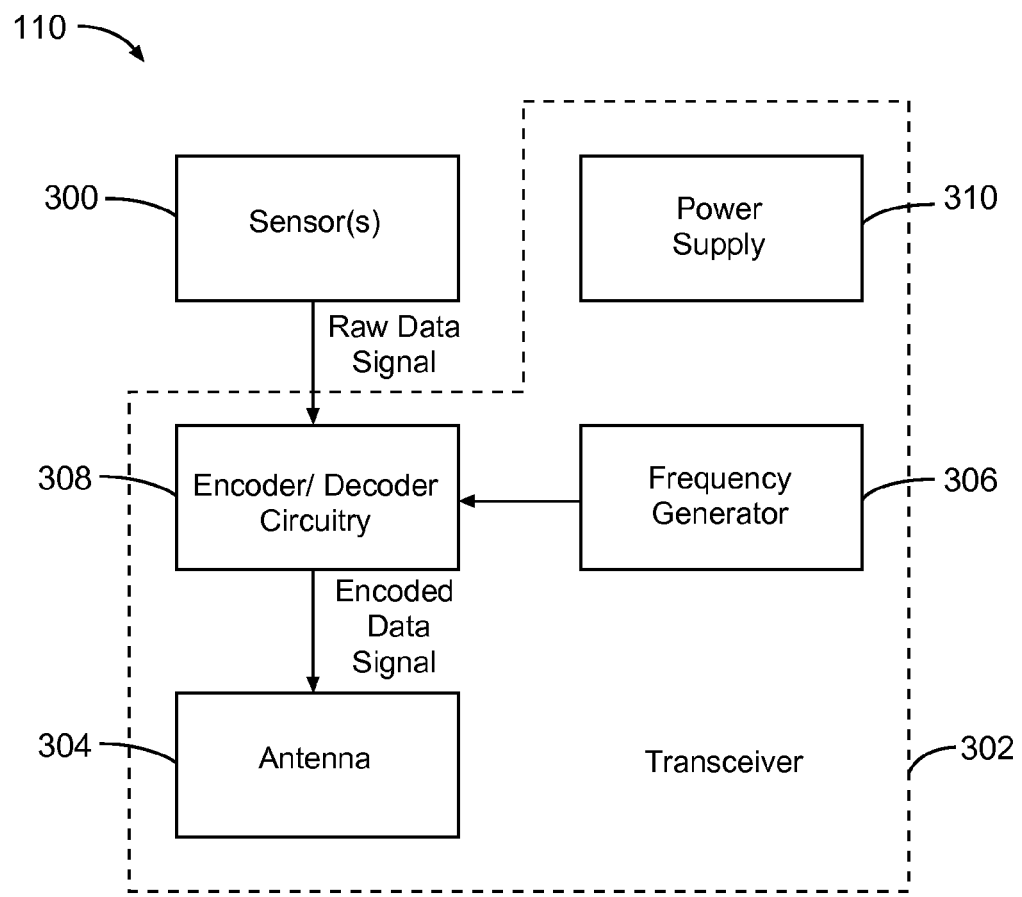
FIG. 3 is a block diagram of an example sensor and telemetry system, illustrating various system components in accordance with some embodiments.

With reference to FIGS. 3 and 4, example embodiments of the sensor/telemetry package 110 are now described in more detail. FIG. 3 shows, in block-diagram form, several components of a sensor/telemetry package 110 according to various embodiments. The package 110 includes a sensor (or system of multiple sensors) 300 and a transceiver 302. The sensor(s) 300 may include, for example, one or more EM fluid sensors, or sensors for RFID tag detection. The transceiver 302 includes an antenna 304 (or multiple antennae) for EM signal transmission and receiving, and components for converting a raw data signal received from the sensor(s) 300 into an encoded data signal suitable for transmission by the antenna 304, such as a waveform generator 306 and signal encoder/decoder circuitry 308. The waveform generator 306 may generate an oscillating current that provides a (for instance sinusoidal) carrier with a frequency in the kilohertz or megahertz regime. The encoder/decoder circuitry 308 modulates the carrier based on the raw data signal received from the sensor(s) 300, using any of a variety of well-known modulation schemes, such as, without limitation, pulse width modulation (PWM), pulse position modulation (PPM), on-off keying (OOK), amplitude modulation (AM), frequency modulation (FM), single-side-band modulation (SSB), frequency shift keying (FSK), phase shift keying (PSK) (binary phase shift keying (BPSK) and N-ary shift keying), discrete multi-tone (DMT), or orthogonal frequency division multiplexing (OFDM).

The sensor/telemetry package 110 may include additional circuitry (not specifically shown) for controlling the operation of the sensor(s) 300 and transceiver 302, processing data from the sensor(s) 300 prior to transmission by the antenna 304, storing data, etc. In some embodiments, such additional circuitry includes one or more processors coupled to data buffers or data storage devices for either temporary or continued storage of instructions, data, etc. The data storage devices may include volatile and/or nonvolatile memory devices, such as, without limitation, DRAM, SRAM, Flash, FRAM, MRAM, and combinations thereof.

Since power delivery to the sensor/telemetry package 110 via cables will not be possible, or at least practical, for many applications, the transceiver 302 further includes an independent power supply 310, which may in some embodiments be rechargeable. In some embodiments, the power supply 310 powers not only the other components of the transceiver 302, but also the sensor(s) 300 associated therewith. Alternatively, the sensor(s) 300 and transceiver 302 may be powered by separate power supplies. The power supply 310 may include one or more batteries or energy-harvesting devices. Electronic control circuitry may control the power supply 310 to operate the sensor(s) 300 and transceiver 302 for a time duration sufficient for monitoring fluids throughout, for example, a pumping process, or a curing process, or any other periods of interest. To provide enhanced power efficiencies, the control circuitry may awaken the transceiver 302 from a sleep state based on any of a variety of factors, including passage of one or more time intervals, prior sensed parameters, etc.

The transceiver 302 may be configured or operated to function as a transmitter, receiver, or both, depending, for instance, on its position within the telemetry system (which includes multiple transceivers 302, as shown in FIG. 1). For example, in the sensor/telemetry package at the deepest position, the transceiver 302 need only encode and transmit signals acquired by the sensor(s) proximate the transceiver 302. Other transceivers 302 may receive and decode (using the encoder/decoder circuitry 308) signals received from transceivers therebelow, as well as re-encode and transmit the signal to relay the data contained therein. Some transceivers may, in addition, encode and transmit data signals from their own proximate sensors, whereas others may function purely to relay signals (in which case they need not have proximate sensors associated therewith). In some embodiments (particularly those where a relaying transceiver does not add further sensor data to the signal), signal relay can be achieved simply by amplifying and re-transmitting the received signal, without the need for any signal decoding and re-encoding. In the embodiment of FIG. 2, the upper-most sensor/telemetry transceiver may use an antenna 302 to receive signals from below, and a separate fiber-optic induction sensor to transmit the signal to the surface.

Although this description focuses on the transmission of sensor data from downhole locations to a surface facility, the transceivers disclosed herein generally facilitate signal transmission in both directions. Signal transmission from the surface downward may be used, for instance, to send control signals to the downhole sensors or transceivers, for example, to turn off or reactivate "sleeping" sensors (as described above), or to reconfigure the transceiver chain (as described below). Accordingly, depending on the particular application, the transceivers can be configured for operation in simplex mode (i.e., for data transmission in only one direction) or in duplex mode (i.e., for data transmission in both directions).

Figure 4B:
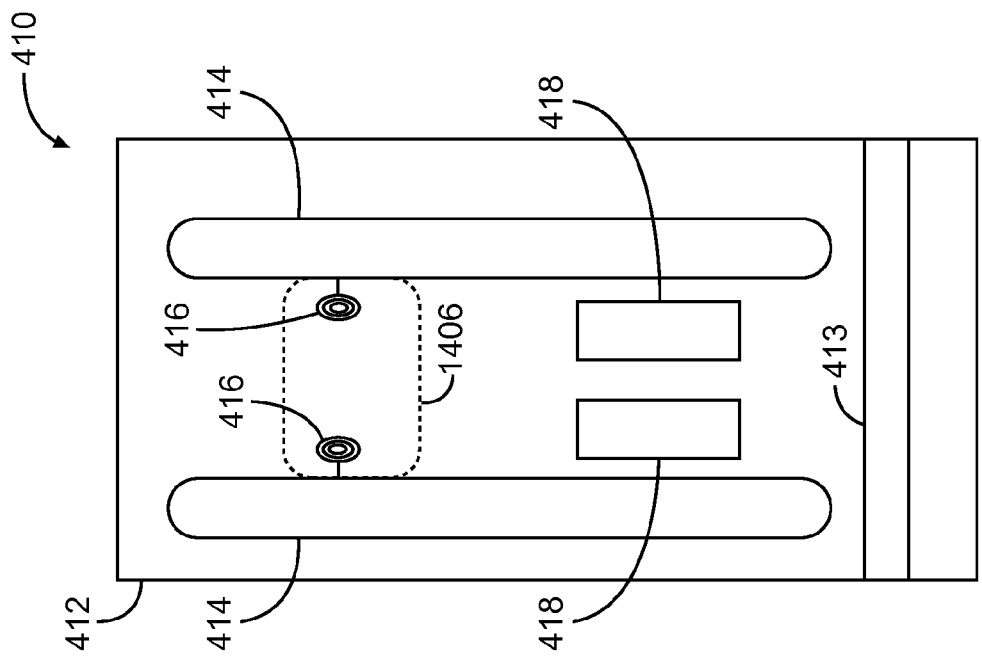
FIGS. 4A and 4B are a schematic perspective view of an example sensor and telemetry system and a schematic cross-sectional view of another example sensor and telemetry system, respectively, illustrating two alternative configurations of various system components around a casing string in accordance with various embodiments.
Figure 4A:
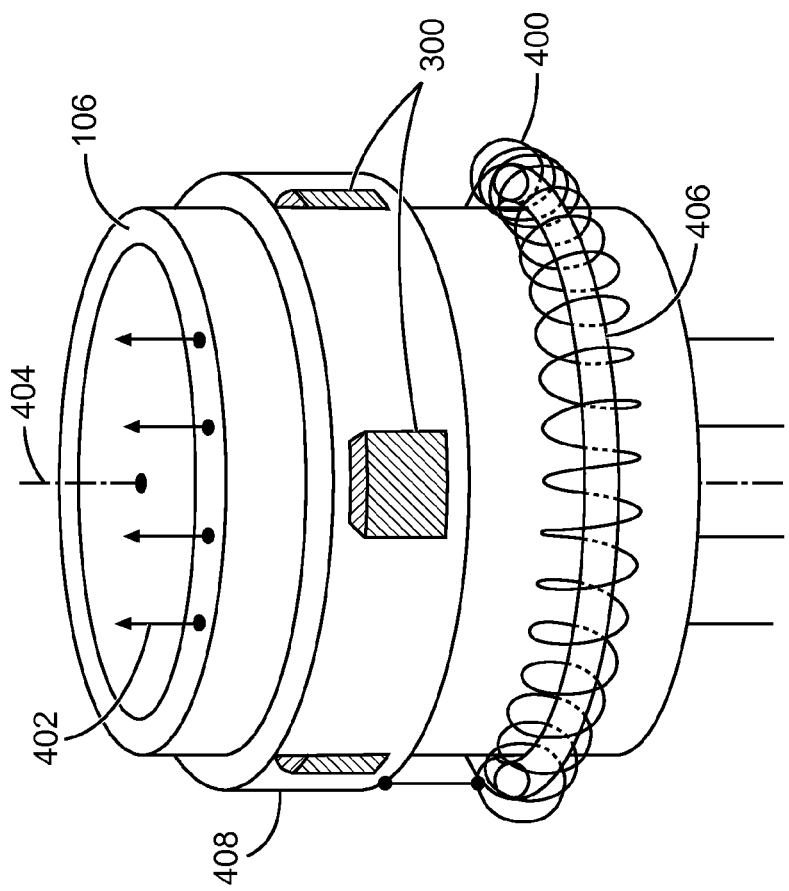

FIG. 4A shows one example configuration of components of the sensor/telemetry package 110. As depicted, in accordance with various embodiments, the antenna 304 is or includes a toroidal coil 400 that circumferentially surrounds the casing string 106 (or, in other words, a solenoid whose axis has been bent along a circle (concentrically) surrounding the casing string 106). The toroidal coil does not need to extend all the way around the casing string. However, extending it all the way maximizes the casing signal generated as the signal is roughly proportional to the angular coverage of the toroidal winding. When an oscillating electrical current flows through the toroidal coil 400, it generates an oscillating magnetic field, which, in turn, can create an oscillating secondary electrical current 402 in a conductor surrounded by the toroidal coil 400, in a direction generally perpendicular to the plane in which the toroidal coil 400 lies. Thus, since the casing string 106 (which is made of a metal/alloy, such as steel) is electrically conductive, the toroidal coil 400, when driven by an oscillating current, functions as a toroidal inductor, inducing an oscillating current 402 in the casing 106 in a direction parallel to the axis 404 of the casing. This current 402 propagates along the casing string 106, and can be detected by the toroidal inductor of a second antenna 304 located above (or below) the toroidal inductor 400 from which the current originates, provided the distance between the two antennae 304 is not so large that the current 402 is attenuated to a level too low for detection. Advantageously, attenuation and leakage into the formation are relatively low for currents propagating in the casing string, as compared with currents propagating through the formation, which may in principal be induced with solenoid antennae wound around the casing.

The toroidal coil 400 may generally have any number of windings; coils with a large number of windings (e.g., hundreds or thousands) are generally preferred, as they result in larger effective magnetic dipole moments and, thus, stronger signals. Moreover, the antenna 304 may include a magnetic core 406 (made, e.g., of ferrite, Mu-metal, or another suitable magnetic material with low hysteresis, low loss, and high relative magnetic permeability) about which the coil turns are wound to further increase inductance and effective magnetic dipole moment. For example, the effective dipole moment of an antenna including one thousand turns about a ferrite core (which has a relative magnetic permeability of about one thousand) is increased by a factor of about one million over a single-turn, air-core antenna. For two antennae operating together as a transmitter-receiver pair, this can increase the minimum detectable voltage (i.e., the minimum input voltage at the transmitting antenna that's detectable by the receiving antenna) by a factor of $10^{12}$, compared with a pair of single-turn, air-core antennas.

Returning to the configuration of the sensor/telemetry package 110, the sensor(s) 300, power supply 310, and electronics components of the transceiver (including, e.g., waveform generator 306 and encoder/decoder circuitry 308) may be disposed above (as shown in FIG. 4) or below the toroidal inductor 400, for example, contained inside an annular housing 408 mounted to the exterior surface of the casing string 106. Within the housing, the various components may be distributed about the circumference. For example, as shown, multiple sensors 300 may be located at different circumferential (or "azimuthal") positions to provide azimuthally resolved measurements. Power supplies, electronic circuitry, etc. may be arranged between the sensors 300. The sensor/electronics package contained inside the annular housing 408 is electrically connected to the toroidal inductor 400. The transceiver antenna 304 and other components of the sensor/telemetry package 110 may be shaped and sized compatible with the limited space available in the annulus formed between the casing and the formation, and the need to allow fluid (including cement) flow through the annulus, and thus past the annular housing. Of course, as will be readily apparent to those of ordinary skill in the art, the various sensor/telemetry components can be configured and arranged in many different ways, the illustrated embodiment being just one example.

Referring now to FIG. 4B, that figure depicts an alternative configuration for a sensor/telemetry package, indicated generally at 410. Sensor/telemetry package 410 includes a body member 412 having a plurality of fins 414 attached thereto, and having at least one toroidal inductor 413 extending around body member 412. In this example, sensor/telemetry package 410 includes a plurality of fins 414 that extend longitudinally along the assembly and in spaced relation to one another around the periphery of the assembly. In many examples, fins 414 will be hollow and will house control circuitry or other electronics, for example, voltage-controlled oscillators, memory, analog RF circuitry, sensors, power systems, processors, and other circuitry to enable communication with an external location, etc. In this example, the fins 414 will further include interrogation circuitry suitable for generating signals to both interrogate RFID tags (which may include additional MEMS sensor components, as described earlier herein) and to receive signals from those interrogated RFID tags. Such signals will be communicated to one or more antennas 416 operatively coupled to each instance of such interrogation circuitry). An instance of interrogation circuitry with at least one antenna will form a "sensor assembly" for sensing the presence of RFID tags, and any additional information obtained when the RFID tags are interrogated (such as sensor data). The example sensor/telemetry package 410 includes a pair of electrode sensors 418, which may be used, in combination with appropriate electronic circuitry, to make electrical measurements of the fluid environment surrounding sensor/telemetry package 410 in a borehole. The various electronic circuits within each fin 414 can be configured to communicate as desired with circuitry in another fin 414. Such communications between electronic circuits can occur through use of any suitable mechanism as will be apparent to those skilled in the art, for example, through use of a serial peripheral interface (SPI), though embodiments are not limited thereto.

Sensor/telemetry package 410 can be configured to be associated with the casing string by a variety of mechanisms. Each sensor/telemetry package 410 includes a body member 412 supporting other components and facilitating association with the casing string. In some embodiments, sensor/telemetry package 410 will include a sleeve body member configured to concentrically engage the outer diameter of a length of casing. In such cases, the sleeve body member can be placed over a length of casing before it is incorporated into the casing string 106, and then secured in place by an appropriate mechanism. As one example, the sleeve body member may be secured against the upset at the box end of the casing section and then clamped in place, or otherwise secured in a desired location—for example through use of an adhesive, such a Protect DRB™ or Protech CRB™ available from the Halliburton Company of Houston, Tex. In other examples, sensor/telemetry package 410 can include a body member configured as a specialized section of casing, which either includes fins 414 as depicted in FIG. 4B, or provides recesses or other structures to house the described components, and configured to be threadably inserted into the casing string. In yet another alternative, sensor/telemetry package 410 can have a supporting body member configured as a hinged clamshell (or a two part assembly) that can be secured concentrically around a length of casing 106, without either having to be joined into the casing string or the casing having to be inserted through the body member, as with the above alternative examples.

Figure 5A:
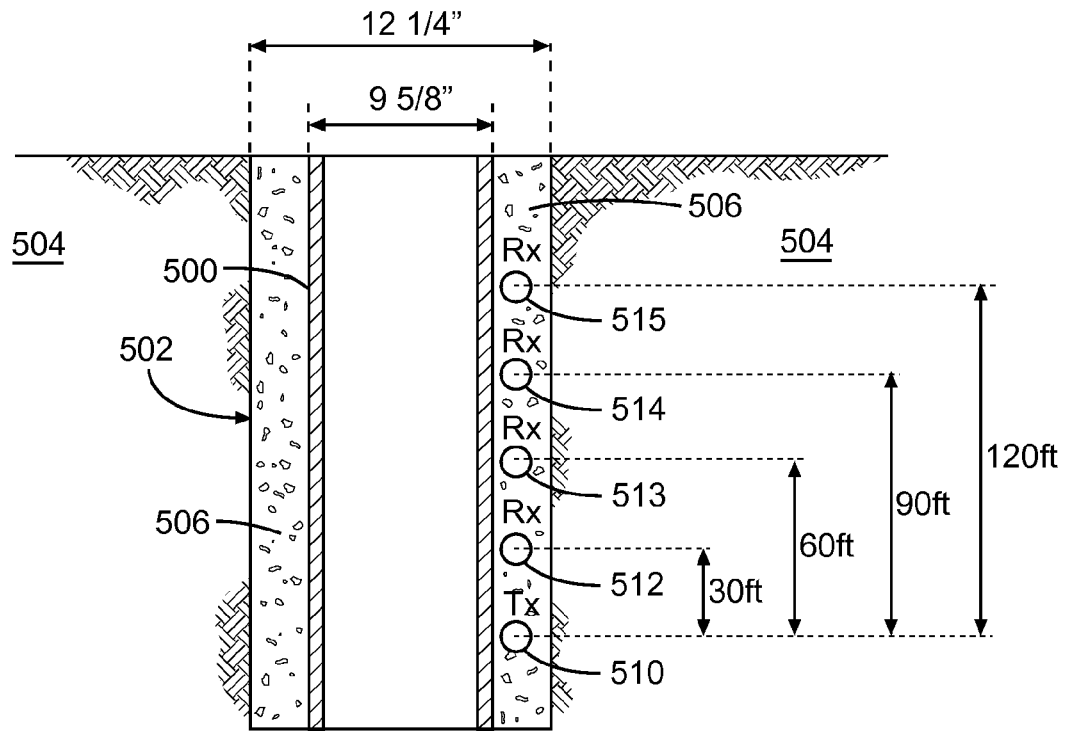
FIGS. 5A and 5B are schematic cross-sectional views of transceiver configurations in boreholes with single and double casings, respectively, in accordance with various embodiments.
Figure 5B:
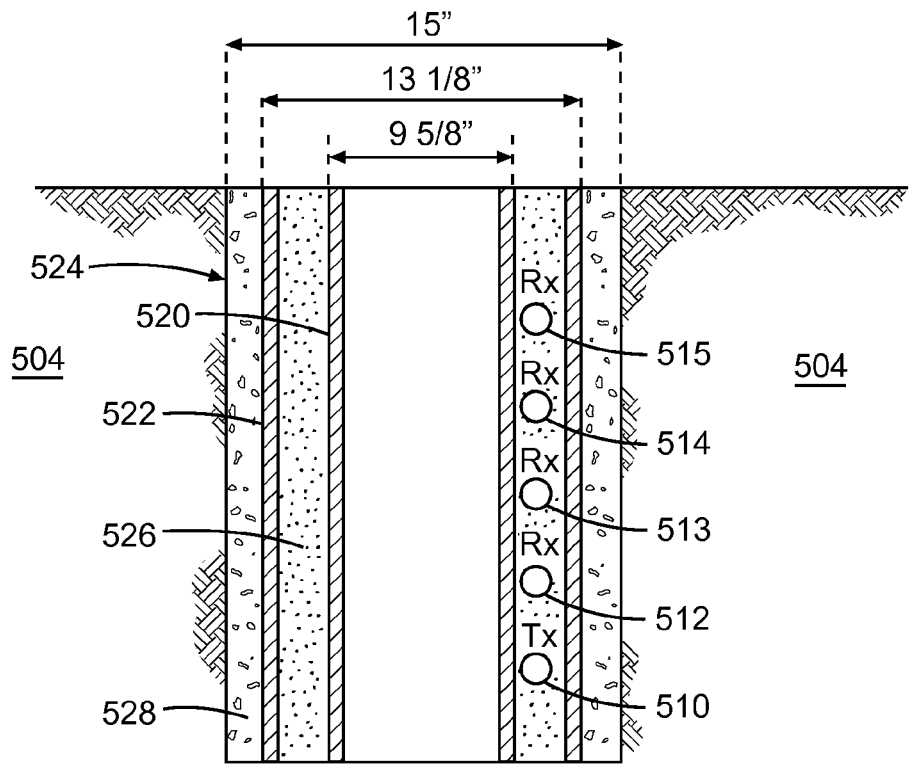

Refer now to FIGS. 5A-8C, which quantify the signal-transmission capabilities of telemetry systems in accordance with various example embodiments. FIG. 5A is a schematic representation of an example representational transceiver system placed behind 9⅝" steel production casing 500 (having a conductivity of σ=$10^7$ S/m (Siemens per meter) and a relative magnetic permeability $\mu_r$=100) in a 12¼" borehole 502 drilled into a formation 504. Cured cement (with a resistivity of 20 Ωm) fills the annulus 506 formed between the production casing 500 and the formation 504. The transceiver system includes five transceivers placed at 30-feet intervals along the casing, operating as a transmitter 510 and four receivers 512, 513, 514, 515 spaced 30 feet, 60 feet, 90 feet, and 120 feet therefrom. FIG. 5B illustrates a similarly configured transceiver system placed behind 9⅝" production casing 520 inside a 13⅛" surface casing 522 in a 15" borehole 524 drilled in a formation 504. Water-based mud (with a resistivity of 1 Ωm) fills the annulus 526 formed between the production casing 520 and the surface casing 522. Cured cement (with a resistivity of 20 Ωm) fills the annulus 528 formed between the surface casing 522 and the formation 504.

Figure 6A:
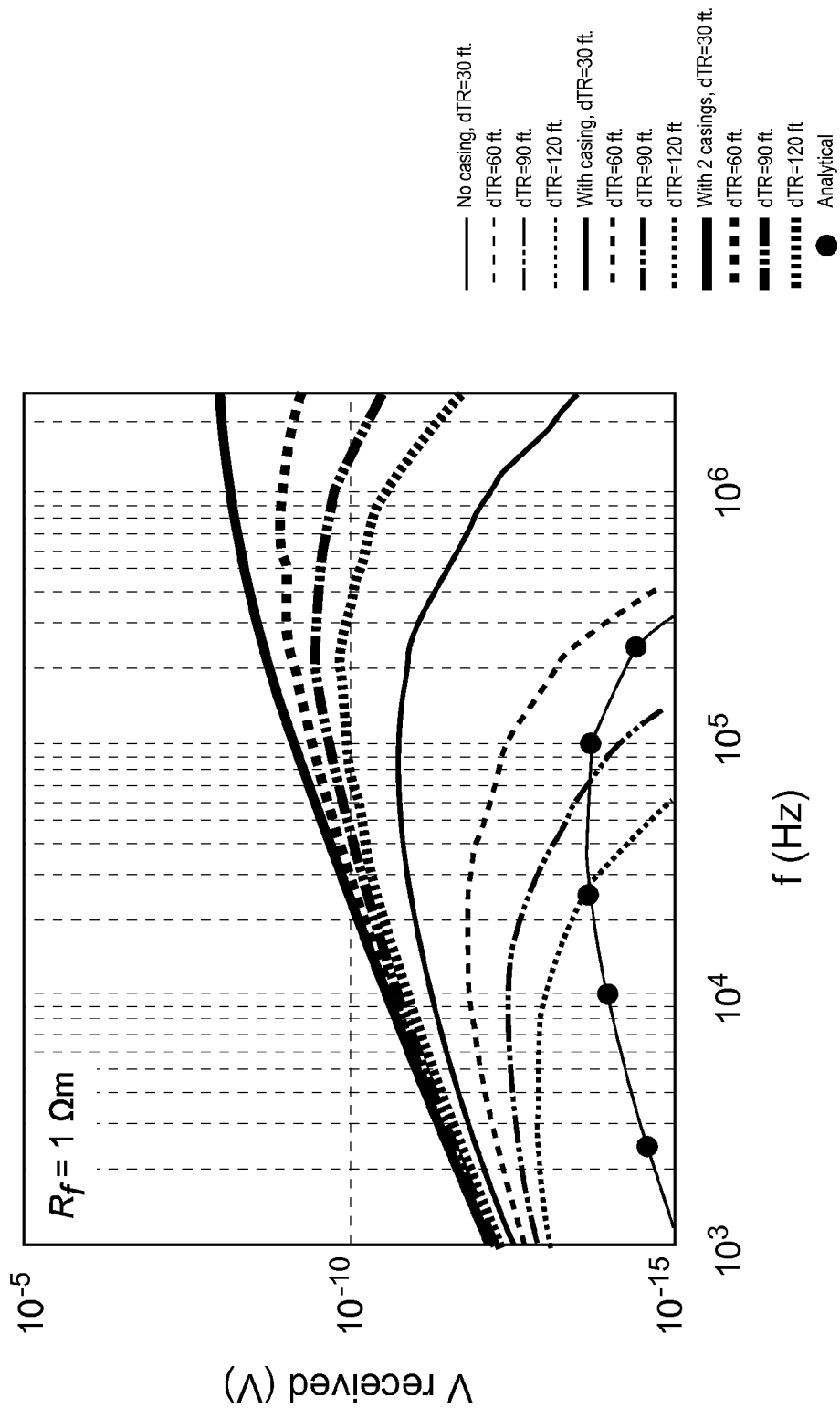
FIGS. 6A-6C are graphs illustrating the induced voltages generated and measured by example toroidal inductor antennae, configured in accordance with FIGS. 5A and 5B, as a function of frequency, for three different formation resistivities.
Figure 6B:
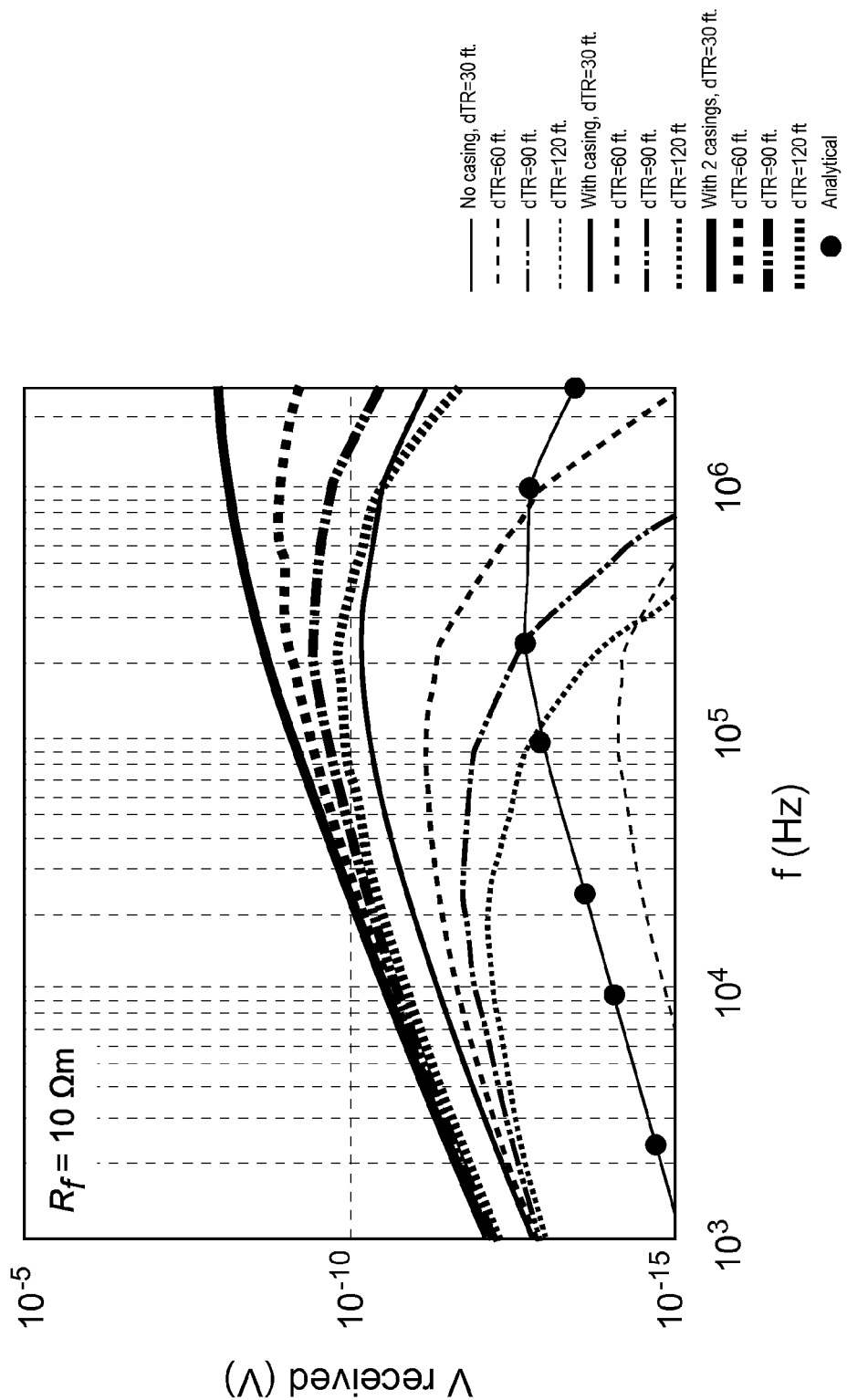
Figure 6C:
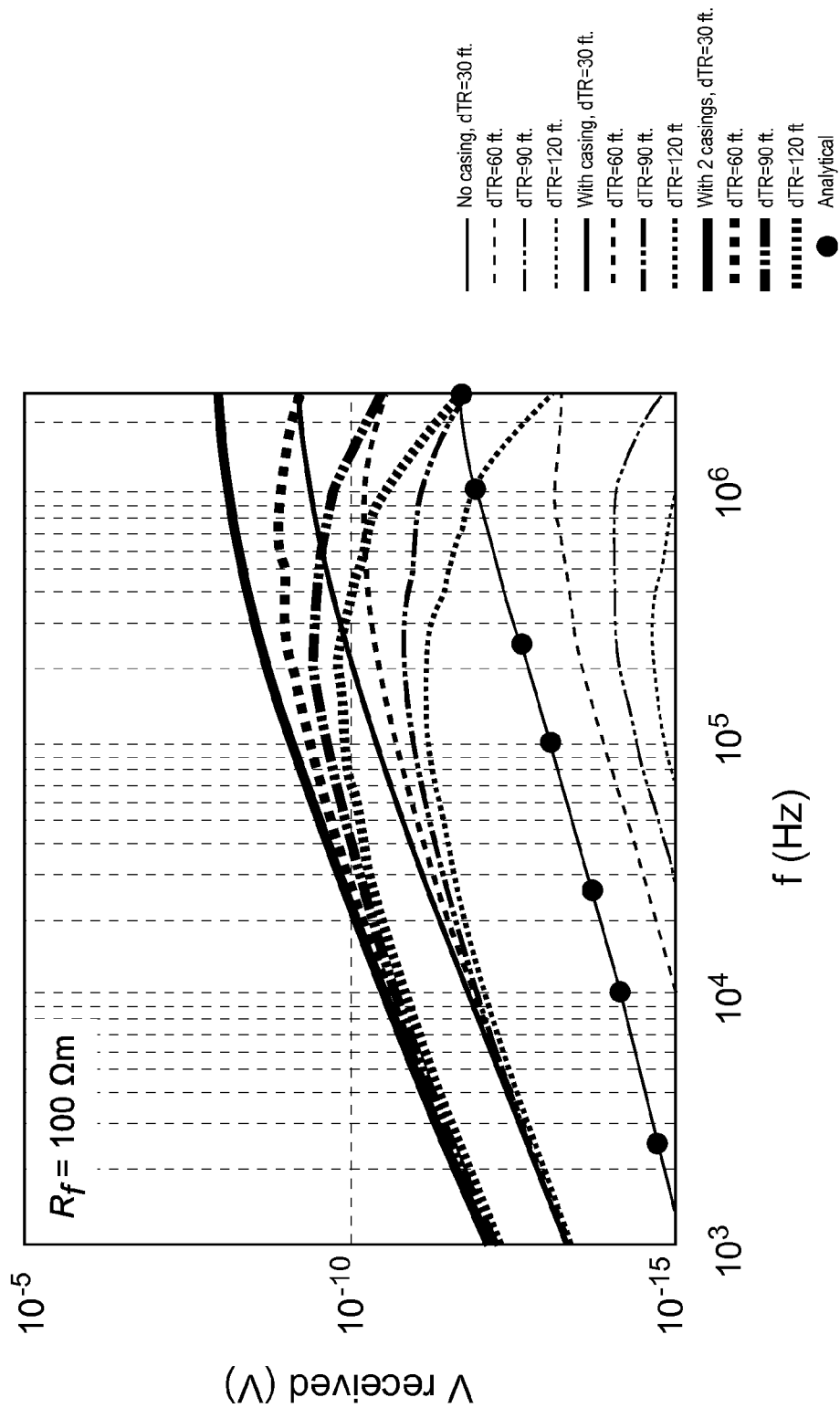

FIGS. 6A-6C are graphs showing, as a function of frequency, the voltages induced, by a single-turn toroidal transmitting antenna 510 with unit dipole moment, in single-turn toroidal receiving antennas 512, 513, 514, 515 with unit dipole moment at distances of 30 ft (solid lines), 60 ft (dashed lines), 90 ft (dash-dotted lines), and 120 ft (dotted lines), respectively. Different line thicknesses depict the data for single casing (see FIG. 5A), double casing (see FIG. 5B), and without casing. The formation resistivity varies between 1 Ωm for FIG. 6A, 10 Ωm for FIG. 6B, and 100 Ωm for FIG. 6C.

As can be seen in FIG. 6A (corresponding to a formation resistivity of 1 Ωm), for single casing and transmitting and receiving toroidal antennae separated by 30 feet, the detected induced voltage, which is indicative of the strength of the generated magnetic field, peaks at about 100 kHz. As expected, the received magnetic fields decrease with increasing transmitter-receiver distance due to attenuation. Further, as the formation resistivity is increased (see FIGS. 6B and 6C in comparison with FIG. 6A), the peak-response frequency and signal level is increased. For double casing and, again, a transmitter-receiver separation of 30 feet, the peak response occurs at about 1 MHz, and the peak response frequency and signal level are largely independent of the formation resistivity (see FIGS. 6B and 6C in comparison with FIG. 6A). Since the received magnetic field strengths are generally higher for double casing, it becomes feasible to increase the distance between transceivers in the telemetry chain. Thus, in embodiments where the distance between neighboring transceivers in a single-cased borehole section is, for example, selected to be 30 feet to ensure sufficient signal strength, it may suffice to place transceivers in the double-cased section every 60 feet (or at some other distance exceeding 30 feet). Furthermore, since the peak response is generally shifted to higher frequencies for double casing, it may be beneficial to operate transceivers in the double-cased section at different frequencies (e.g., at 100s kHz to MHz) than transceivers in the singled-cased section (where frequencies may range, e.g., from 10s to 100s of kHz).

Figure 7:
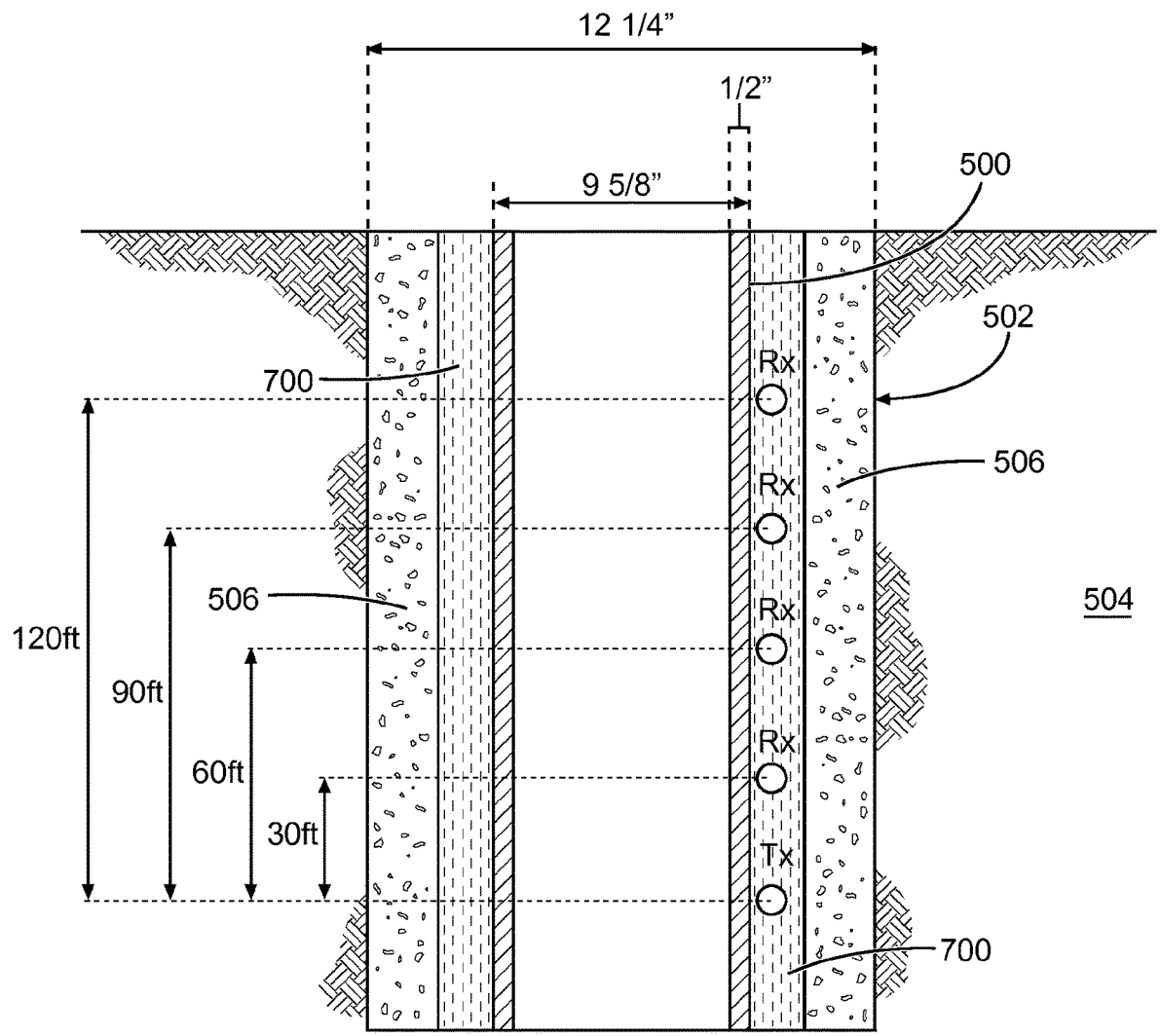
FIG. 7 is a schematic cross-sectional view of a transceiver configuration in a borehole with single casing coated with an electrically insulating material in accordance with various embodiments.
Figure 8:
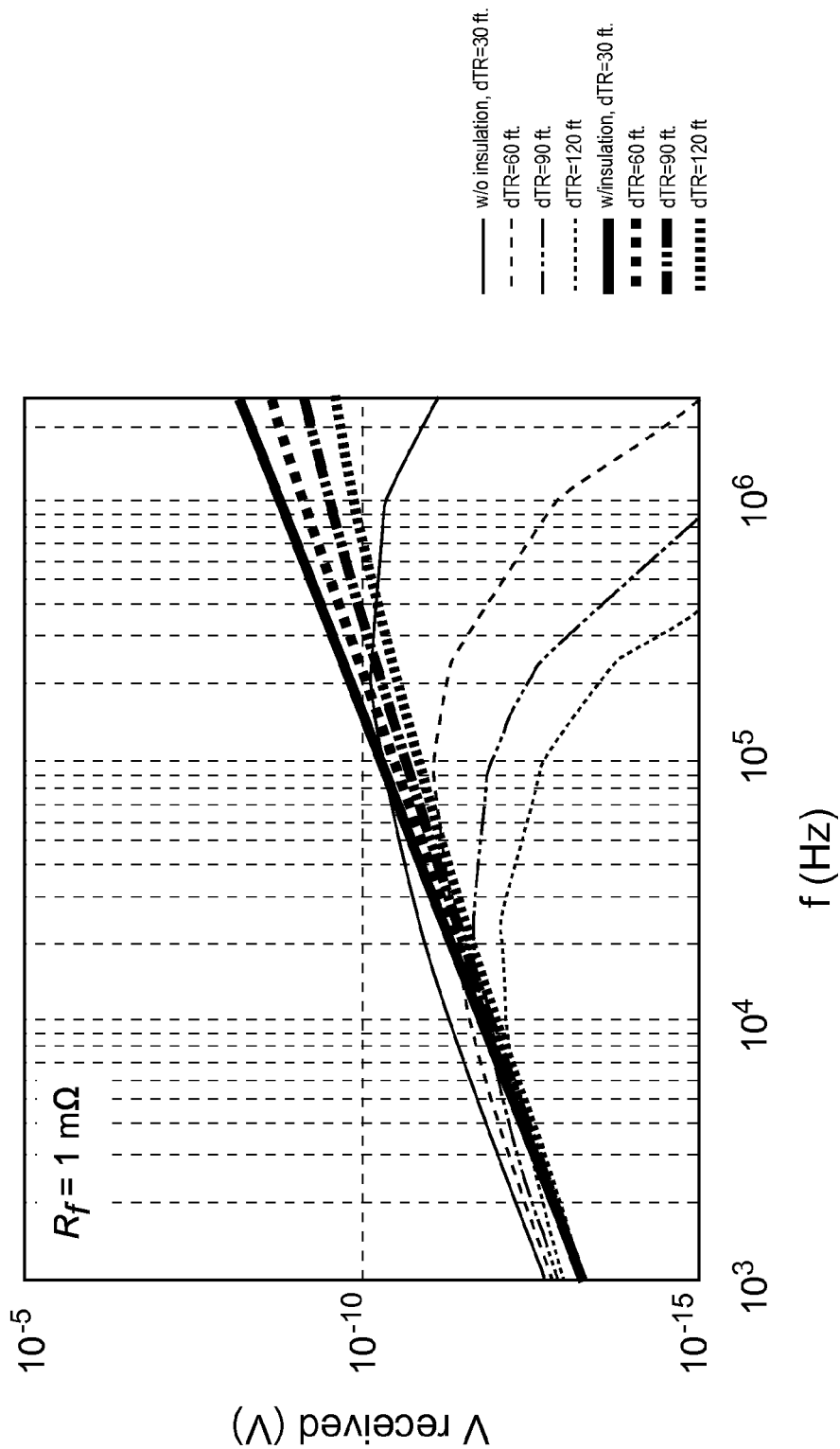
FIG. 8 is a graph illustrating the induced voltage generated and measured by example toroidal inductor antennae, configured in accordance with FIG. 7, as a function of frequency.

In some embodiments, illustrated in FIG. 7 for a single-cased borehole, the casing 500 is coated with a layer 700 of electrically insulating material to limit current leakage of the induced current from the casing 500 into the formation. The electrically insulating material may be or include, for example, as a paint, polymer, or ceramic that exhibits high electrical resistivity and is abrasion-resistant, in accordance with general casing-emplacement and well-completion practices. FIG. 8 presents the measured magnetic fields resulting from the use of an electrically insulating coating (for a formation resistivity of 1 Ωm and transmitter-receiver distances of 30 ft, 60 ft, 90 ft, and 120 ft), in comparison with the corresponding data (of FIG. 6A) for casing without insulation. As can be seen, the presence of the electrically insulating material tends to improve the signal strength, at least for frequencies near or above the peak-response frequency. In some embodiments, electrical insulation of the casing is realized not with a separate insulating layer, but with a cement slurry containing appropriate chemical additives to increase the electrical resistivity of the cured cement.

In various embodiments, transceivers can be operated with a dynamically configurable (or "ad-hoc") network topology that does not require serial signal transmission from one transceiver to the next (i.e., the closest one). Rather, when the signal levels are sufficiently high, the telemetered signals can skip over one or more transceivers. For example, when transceivers are placed along the casing string every 30 feet, signals may transmitted over 60-feet stretches and thus relayed along an active telemetry chain including only every other transceiver. The inactive transceivers that are skipped over can serve to provide system redundancy and/or reliability in situations where signal levels are weaker (e.g., due to a more conductive formation), or facilitate multiple signal channels, as explained below. Furthermore, the transmitted signal strengths may be deliberately adjusted, based, among other things, on transmitter-receiver distances and minimum detectable signal levels, to control, reduce, or avoid cross-talk between receiving antennae.

As will be apparent from the graphs shown in FIGS. 6A-6C and 8, telemetry via toroidal antennas in accordance herewith supports a broad band of transmission frequencies. This not only renders a large number of modulation schemes applicable for data-encoding, but also facilitates multiple signal channels utilizing multiple respective frequency bands. In some embodiments, one or more transceivers are configured to each operate (simultaneously) in multiple frequency bands. For example, a transceiver (at a certain position along the casing string) may transmit a superposition of signals components having different respective carrier frequencies. Alternatively, in some embodiments, different sub-sets of the transceivers may be operated within different frequency bands. For example, along the casing string, transceivers operating at a first frequency may alternate with transceivers operating at a second, different frequency, creating two parallel signal channels. This is feasible, for instance, if transceivers are spaced at 30-feet intervals, but signals can travel at least sixty feet without the need for relay or amplification. Similarly, if signal transmission to the surface can be accomplished with transceivers spaced 90 feet apart, a system of transceivers spaced at 30-feet intervals allows for three separate signal channels, and so on. The different signal channels need not necessarily utilize different frequency bands. Alternatively, signals transmitted by the transceivers may include header and data portions, where the header specifies the intended recipient transceiver of the signal. While signals are broadcast along the casing string and thus in principle detectable by every receiver that is sufficiently close to the transmitter, transceivers to which a particular signal is not addressed may simply ignore that signal. Communication protocols for implementing addressable signals are well-known to those of ordinary skill in the art.

Where the transceivers are configured to provide multiple signal channels, one or more of the channels may be configured to preferentially carry only data from certain sensors or data of a certain property. For example, during a cementing operation one type of relatively high value data is that indicating arrival at a given sensor depth of the top of cement. In systems in which RFID tags with an identifiable frequency or other detectable characteristic are placed within the cement introduced into the well, the initial detection of such RFID tags associated with the cement will be indicative of arrival of the cement fluid volume at the sensor depth. In a multiple channel transceiver system, one channel might be isolated, for example, to carry only sensor data of sensing the RFID tag configuration associated with the cement, or potentially to carry only data of initial sensing at a sensor of such RFID tag configuration, indicating arrival of the top of cement.

By dedicating a channel to such data, it may be possible to avoid delays in transmission resulting from compiling increasing amounts of data as the signals are conveyed up through the transceiver system. In some example systems, it may be desirable to configure such a priority communication channel to use a streamlined communication protocol and/or to have a priority for retransmission within each transceiver, so as to further enhance the communication capabilities of the channel. In one possible example, the system may be configured merely to transmit a burst signal indicating that an indicator of the arrival of top of cement has been detected, and an indicator of the sensor (and therefore the depth at which the detection was made), to provide optimally streamlined communication of the movement of the top of cement. As will be apparent to those skilled in the art having the benefit of this disclosure, other types of information may similarly be given high priority, including data associated from specific sensors were data obtained only through certain types of sensors.

Although specific embodiments have been illustrated and described herein, it should be appreciated that any arrangement configured to achieve the same purpose may be substituted for the specific embodiments shown. This disclosure is intended to cover any and all adaptations or variations of various embodiments. Combinations of the above embodiments, and other embodiments not described herein, will be apparent to those of skill in the art upon reviewing the above description.

The invention claimed is:

1. A telemetry system, comprising:
a plurality of electromagnetic transceivers disposed outside a well casing string at a corresponding plurality of depths along the casing string, each transceiver comprising at least one toroidal inductor circumferentially surrounding the casing string, the plurality of transceivers including,
a first transceiver configured to transmit a first signal along the casing string comprising data from a first sensor proximate the first transceiver, and
a second transceiver, located above and in spaced relation to the first transceiver, the second transceiver configured to receive the first signal from the first transceiver along the casing string and to transmit a second signal along the casing string that relays the data from the first sensor.

2. The telemetry system of claim 1, wherein the second transceiver is further configured to transmit data from a second sensor proximate the second transceiver.

3. The telemetry system of claim 1, wherein the telemetry system is disposed on the casing string within a borehole, whereby the first and second transceivers are each permanently coupled in a fixed position within the well bore when the casing string is cemented in place within the borehole.

4. The telemetry system of claim 1, wherein the first and second transceivers are each configured to transmit signals through use of the respective associated toroidal inductor wherein the signals are in the frequency range of 10 kHz to 3 MHz.

5. The telemetry system of claim 1, wherein the transceivers are communicatively coupled to each other at least in part via currents induced in the casing string by the toroidal inductors.

6. The telemetry system of claim 1, wherein the first signal comprises a header identifying the second transceiver.

7. The telemetry system of claim 1, wherein the transceivers are spaced at intervals not exceeding 120 feet.

8. The telemetry system of claim 1, wherein the casing string comprises a plurality of segments coupled together, each segment having one of the plurality of transceivers located thereat.

9. The telemetry system of claim 1, further comprising first and second sensor/telemetry packages, each sensor/telemetry package extending around a respective length of casing within the casing string, and wherein the first sensor/telemetry package comprises the first electromagnetic transceiver, and the second sensor/telemetry package comprises the second electromagnetic transceiver.

10. The telemetry system of claim 9, wherein each sensor/telemetry package comprises a sleeve extending around and attached to the adjacent length of casing.

11. The telemetry system of claim 1, further comprising a surface control and processing facility, the plurality of transceivers being spaced from each other and from the surface control and processing facility such that each transceiver is communicatively coupled to the surface control and processing facility.

12. The telemetry system of claim 11, wherein at least one of the transceivers is communicatively coupled to the surface control and processing facility via at least one other transceiver located thereabove.

13. The telemetry system of claim 11, further comprising an optical fiber communicatively coupling the surface control and processing facility to one of the transceivers.

14. The telemetry system of claim 1, wherein the plurality of transceivers comprises at least two disjoint groups of transceivers, the transceivers of each group being communicatively coupled to each other but not to transceivers in another group, whereby each group provides a separate signal channel.

15. The telemetry system of claim 14, wherein the groups of transceivers are dynamically configurable.

16. The telemetry system of claim 14, wherein each group has an associated signal-frequency band in which the transceivers of that group operate, a signal-frequency band associated with a first one of the groups differing from a signal-frequency band associated with a second one of the groups.

17. The telemetry system of claim 14, wherein the transceivers within each group are configured to transmit signals addressed only to one or more transceivers with that group.

18. The telemetry system of claim 14, wherein the transceivers of the at least two groups are disposed along the casing string in an alternating fashion.

19. The telemetry system of claim 1, wherein at least some of the transceivers are configured to operate in multiple frequency bands, thereby providing multiple corresponding signal channels.

20. The telemetry system of claim 19, wherein the transceivers configured to operate in multiple frequency bands transmit signals comprising a superposition of signal components falling within the multiple frequency bands.

21. The telemetry method of claim 20, wherein transmitting the first and second signals comprises inducing oscillating electrical currents in the casing string.

22. A telemetry method employing a plurality of electromagnetic transceivers disposed outside a well casing string at a plurality of depths along the casing string each transceiver comprising at least one toroidal inductor circumferentially surrounding the casing string, the method comprising:
using a first one of the electromagnetic transceivers, transmitting a first signal along the casing string comprising data from a first sensor proximate the first electromagnetic transceiver; and
using a second one of the electromagnetic transceivers, located above and in spaced relation to the first electromagnetic transceiver, receiving the first signal along the casing string and transmitting a second signal along the casing string that relays the data from the first sensor.

23. A telemetry system comprising:
a plurality of electromagnetic transceivers disposed outside a well casing string at a corresponding plurality of depths along the casing string, each transceiver comprising at least one toroidal inductor circumferentially surrounding the casing string, the plurality of transceivers being configured into multiple groups of transceivers forming multiple respective signal channels, the transceivers within each group being communicatively coupled to each other by being configured to send signals along the casing string,
wherein at least one of the signal channels is configured to preferentially carry selected sensor data.

* * * * *